(12) United States Patent
van Raalten et al.

(10) Patent No.: US 12,104,037 B2
(45) Date of Patent: Oct. 1, 2024

(54) USE OF CARBON-NANOFIBRE COMPRISING CARBON NETWORKS

(71) Applicant: CarbonX IP 5 B.V., Amsterdam (NL)

(72) Inventors: Rutger Alexander David van Raalten, Amsterdam (NL); Daniela Sordi, Amsterdam (NL)

(73) Assignee: CarbonX IP 5 B.V., Amsterdam (NL)

( * ) Notice: Subject to any disclaimer, the term of this patent is extended or adjusted under 35 U.S.C. 154(b) by 909 days.

(21) Appl. No.: 17/058,140

(22) PCT Filed: May 27, 2019

(86) PCT No.: PCT/EP2019/063627
§ 371 (c)(1),
(2) Date: Nov. 24, 2020

(87) PCT Pub. No.: WO2019/224397
PCT Pub. Date: Nov. 28, 2019

(65) Prior Publication Data
US 2021/0198446 A1   Jul. 1, 2021

(30) Foreign Application Priority Data

May 25, 2018   (EP) ..................................... 18174410

(51) Int. Cl.
| | |
|---|---|
| *C08K 3/04* | (2006.01) |
| *B01J 20/20* | (2006.01) |
| *C08L 23/14* | (2006.01) |
| *B82Y 30/00* | (2011.01) |
| *B82Y 40/00* | (2011.01) |

(52) U.S. Cl.
CPC ............. *C08K 3/046* (2017.05); *B01J 20/205* (2013.01); *C08L 23/14* (2013.01); *B82Y 30/00* (2013.01); *B82Y 40/00* (2013.01); *C08K 2201/001* (2013.01); *C08K 2201/011* (2013.01);
(Continued)

(58) Field of Classification Search
None
See application file for complete search history.

(56) References Cited

U.S. PATENT DOCUMENTS 11,767,220 B2 * 9/2023 van Raalten ........... C08K 3/046
                                                    106/476
2010/0173070 A1 * 7/2010 Niu ....................... B01D 39/086
                                                    427/304
(Continued)

FOREIGN PATENT DOCUMENTS

| WO | WO2009/053470 A1 | 4/2009 |
| WO | WO2014/108876 A2 | 7/2014 |
| WO | WO2018/002137 A1 | 1/2018 |

*Primary Examiner* — Seth Dumbris
(74) *Attorney, Agent, or Firm* — N.V. Nederlandsch Octrooibureau (57) ABSTRACT

The invention pertains to the use of porous, chemically interconnected, isotropic carbon-nanofibre-comprising carbon networks in an anti-static, electrostatic dissipative or conductive layer with a thickness of less than 1000 μm. It has been found that said carbon-nanofibre-comprising carbon networks can beneficially be used in an anti-static or an electrostatic dissipative layer where the surface or the volume resistivity needs to be carefully controlled. Also it has been found that the viscosity of a composite responds weakly to said carbon networks which allows to draw high quality layers.

14 Claims, 1 Drawing Sheet

(52) U.S. Cl.
CPC .... *C08K 2201/017* (2013.01); *C08L 2201/04* (2013.01); *Y10T 428/30* (2015.01)

(56) References Cited

U.S. PATENT DOCUMENTS

2013/0052462 A1* 2/2013 Ichinose ............ B01J 20/28007
977/762
2017/0373325 A1* 12/2017 Okano ................ D04H 1/4242

\* cited by examiner

USE OF CARBON-NANOFIBRE COMPRISING CARBON NETWORKS

FIELD OF THE INVENTION

The invention is in the field of anti-static, electrostatic dissipative or (semi-)conductive materials, particularly in the field of producing sheets or films.

BACKGROUND TO THE INVENTION

Control over the build-up of static electricity is considered important in many areas of technology, particularly in the area of electronics. Plastic materials, which seem to be universally present, are especially prone to becoming statically charged. Typically, plastic has a high electrical resistance and does hardly allows—if at all—for the movement of charges on its surface or throughout its body. Plastics are thus regarding insulating materials. When two insulators at close range are moved relative to one another, electric charge can build up. Both insulators will become either positively or negatively statically charged. Such a build-up of charge is referred to as static electricity and is often unwanted. Not only can it result in the adherence of plastic films and/or sheets to one another which may be problematic from a factory production perspective or which may lead to an unsatisfactory consumer experience. It may also cause product failure, which is especially the case for electronic products where a low voltage discharge can cause severe damage to a sensitive product. And, perhaps the most significant unwanted effect is that the discharge of static charge can lead to a hazard such as fire or explosions.

The build-up of static charge can be prevented by using thin films of conducting materials that are properly grounded. Alternatively, one may use anti-static or static-dissipative materials. These are materials that have a conductivity lower than a conductor but higher than an insulator. Or, in other words, the resistivity is higher than that of a conductor but lower than that of an insulator. The increase in resistivity prevents an uncontrolled release of energy which could be the case when using fully conductive materials.

It is known that the build-up of static electrical charges on plastics during factory processing or use can be prevented by using electrostatic dissipative (ESD) materials. If beneficial an article may be manufactured fully from ESD material, such as ESD packaging or ESD films. However, it is also possible to coat an article with an ESD film or layer such that proper electrostatic protection is achieved. A common technique to increase the conductivity of an insulator, and hence produce an ESD material, is to incorporate an anti-static or a conductivity agent. A typical example of such an agent is carbon black. For instance in WO 2014/108876 it is described how carbon black along with a non-conductive polymer can be used to produce a thermoplastic ESD composite.

In general, the challenge with carbon fillers is to precisely control the required resistivity value due to a steep percolation curve associated with these materials. Known carbon fillers have the property that slight dose variations (which may be as little as 1 wt. %) could result in a drastic change of conductive properties (resulting in a change from fully insulating to fully conductive or vice versa). This in turn, might result in an unwanted and uncontrolled release of energy due to static charge build-up in a manufactured article comprising a material with said carbon filler.

It would thus be desired to broaden the percolation slope which would mean increased dosing tolerance or a broadened dosing window. This would again allow for better control of the resistivity values and for specifically tuned conductivity. However, the currently known anti-static or conductivity agents are often difficult to process. This includes challenges relating to the dispersion process as well as to changes of the material properties induced by anti-static or a conductivity agent. For example, carbon black is known to increase the viscosity of materials to which it is added. So an ESD composite comprising an insulating material and carbon black will have a much higher viscosity than the insulating material without the carbon black. This viscosity increase is unwanted from a production perspective and leads to all kinds of production challenges. An example of such a challenge is poor dispersion as a result of the viscosity increase, which may in turn lead to subsequent negative consequences such as brittle materials. For the production of layers or thin films, it is essential to have quite a low viscosity. If the melt from which the layers are produced has a too high viscosity it is simply not possible to achieve a sufficiently low thickness. Hence, the current technology is limited with respect to the production of ESD layers.

There is thus a need for solving the problem of obtaining anti-static, electrostatic dissipative or conductive layer layers which have a sufficiently low thickness as well as the desired ESD properties.

SUMMARY TO THE INVENTION

The inventors have found that a recently developed grade of a carbon-nanofibre-comprising carbon network can be beneficially be used in a layer (i.e. film or sheet) with a thickness of less than 1000 μm. Said carbon-nanofibres comprising carbon network is a porous, chemically interconnected, carbon-nanofibres comprising carbon network that can be incorporated in said layer using conventional production techniques. The carbon-nanofibre-comprising carbon network may especially be used to increase the conductivity of said layer. The inclusion level of the carbon network may be chosen as desired but will normally be more than 10 wt. % of the layer. Reference is made to the examples.

The porous, chemically interconnected, crystalline, carbon-nanofibre-comprising carbon networks beneficially allow to accurately control the resistivity of the layer in which the carbon networks are embedded. In other words, upon increasing the inclusion level of carbon networks the volume resistivity deceases only gradually. A typical graph of inclusion level of carbon networks plotted against the volume resistance will show a high volume resistance (e.g. $10^{12}$ Ω·cm) at low inclusion levels, at a certain inclusion level (e.g. about 15 wt. %) the volume resistance will start declining slowly until it levels out at a lower volume resistivity (e.g. $10^2$ Ω·cm) at a much higher inclusion level (e.g. about 30 wt. %). Hence the dosing window, which is sometimes also denoted as the (dosing) tolerance in the field, over which the volume resistivity can be controlled is about 15 wt. %. Such a high dosing window of at least 6 wt. %, more preferably at least 12 wt. %, even more preferably at least 14 wt. % and most preferably at least 16 wt. % is very beneficial for the production of anti-static, electrostatic dissipative or conductive layers. This behaviour is in sharp contrast to the behaviour of carbon black, carbon nanotubes, graphite, etc., which abruptly go from insulating to conducting in a dosing window of about 1 wt. %. Within such small window there is no opportunity to accurately tune the volume resistivity of a layer. Due to the large dosing tolerance, the porous, chemically interconnected, crystalline, carbon-nanofibre-comprising carbon networks, on the other hand, allow for carefully tuning the volume resistivity of a layer to range, for instance, in the anti-static range (between $10^8$ Ω·cm and $10^{10}$ Ω·cm) or in the static-dissipative range (between 104 Ω·cm and $10^8$ Ω·cm).

The manufacturing shows advantages in terms of Melt flow index (MFI) and melt strength. The MFI is a measure of the flow resistance of a polymer and melt strength is defined as the maximum tension that can be applied to the melt without breaking. Both are important parameters in making thin films, and advantageous MFI and melt strength make it possible to make homogeneous thin films where materials such as carbon black fail. MFI is defined as the mass of polymer that flows through an orifice or a capillary of a certain thickness and weight at a specific pressure and temperature. A high viscosity hence corresponds with a low MFI and vice versa. The porous, chemically interconnected, crystalline, carbon-nanofibre-comprising carbon networks show beneficial behaviour with respect to viscosity and melt flow index (MFI) of the compounds in which they are present. For instance, when polypropylene copolymer (PPC) is loaded with 20 wt. % carbon networks or with Vulcan XC72 (which is a grade of carbon black often used for increasing conductivity of a material), it has been found that the MFI of the PPC with carbon networks is three times higher than the MFI of the PPC with Vulcan XC72. As a result, at those inclusion levels which are relevant for conductive layers, composites with carbon networks have a lower viscosity than composites with carbon black, making film or sheet formation from composites with carbon networks relatively easy in terms of processing and allows for thin film production in a more reliable way.

It is hence understood that the porous, chemically interconnected, crystalline, carbon-nanofibre-comprising carbon networks are particularly suitable for use in conductive layers, sheets and (thin)films. This allows for careful control of the conductive properties and tuning of the volume resistance. Also, because the viscosity of the composite mixture will be relatively low, it allow to make thinner films compared to current prior art technology.

The layer may be an anti-static layer, an electrostatic dissipative layer or a conductive layer. The volume resistivity may hence be lower than $10^{10}$ Ω·cm. In some applications it will be desirable to tune the volume resistivity to range between $10^4$ and $10^{10}$ Ω·cm. In other embodiments, it is desired obtain a conductive layer having a volume resistivity<$10^4$ Ω·cm. In the art, conductive carbon comprising layers are also sometimes denoted as semi-conductive to indicate that they are indeed conductive but still do not reach the conductivity of metals. The same terminology also applies to the layers according to the invention.

The network may comprise crystalline carbon-nanofibres, which may have an average length of about 30-10,000 nm. Said porous networks can be seen as a big molecule and can hence be described as an intraparticle porous network.

The layers comprising carbon networks of the invention may be made from a variety of materials, but are usually polymeric layers. These layers comprising carbon networks of the invention may suitably be used in many areas of technology including packaging materials, electrodes, batteries, water purification, micro-electronics, micro-chip and wafer production, electro-magnetic shields, and thin film solar cells, as well as coatings and even deposited inks.

The invention also comprises the use of porous, chemically interconnected, carbon-nanofibres comprising carbon network for reducing the thickness of a carbon-nanofibre-comprising layer.

EMBODIMENTS OF THE INVENTION

1. Use of a porous, chemically interconnected, carbon-nanofibres comprising carbon network in an anti-static, electrostatic dissipative or conductive layer with a thickness of less than 1000 μm;
2. The use according to embodiment 1, wherein the use is for increasing conductivity in an anti-static, electrostatic dissipative, semi-conductive or conductive layer;
3. The use according to any one of the previous embodiments, wherein the inclusion level of the carbon network is more than 10 wt. % of the layer;
4. An anti-static, electrostatic dissipative, semi-conductive or conductive layer with a thickness of less than 1000 μm, preferably less than 250 μm, comprising at least 10 wt. % of a porous, chemically interconnected, carbon-nanofibre-comprising carbon network;
5. The use according to any one of embodiments 1-3 or the layer according to embodiment 4, wherein the carbon network comprises crystalline carbon-nanofibres;
6. The use according to any one of embodiments 1-3 or 5 or the layer according to embodiment 4 or 5, wherein the carbon network is an intraparticle porous network;
7. The use according to any one of embodiments 1-3 or 5-6 or the layer according to any one of embodiments 4-6, wherein the average fibre length of the carbon-nanofibres is 30-10,000 nm;
8. The use according to any one of embodiments 1-3 or 5-7 or the layer according to any one of embodiments 4-7, wherein the layer is a polymeric layer;
9. The use according to any one of embodiments 1-3 or 5-8 or the layer according to any one of embodiments 4-8 wherein the volume resistivity is $10^0$-$10^{10}$ Ω·cm;

10. The use according to any one of embodiments 1-3 or 5-9 or the layer according to any one of embodiments 4-9, wherein the carbon network is obtainable by a process for producing crystalline carbon networks in a reactor 3 which contains a reaction zone 3b and a termination zone 3c, by injecting a water-in-oil or bicontinuous micro-emulsion c comprising metal catalyst nanoparticles, into the reaction zone 3b which is at a temperature of above 600° C., preferably above 700° C., more preferably above 900° C., even more preferably above 1000° C., more preferably above 1100° C., preferably up to 3000° C., more preferably up to 2500° C., most preferably up to 2000° C., to produce crystalline carbon networks e, transferring these networks e to the termination zone 3c, and quenching or stopping the formation of crystalline carbon networks in the termination zone by spraying in water d;

11. An article of manufacture comprising the layer of any one of embodiments 4-10;

12. The article of manufacture according to embodiment 11 wherein the layer is a deposited ink, an applied coating or a packaging material; and 13. Use of porous, chemically interconnected, carbon-nanofibres comprising carbon network for reducing the thickness of a carbon-nanofibre-comprising layer, preferably of a carbon-nanofibre-comprising layer with a thickness of less than 1000 μm, preferably less than 250 μm.

DETAILED DESCRIPTION

The invention can be described as the use of porous, chemically interconnected, carbon-nanofibres comprising carbon network in a conductive layer with a thickness of less than 1000 μm. Conveniently layers of 250-1000 μm are denoted as sheets whereas thinner layers, i.e. layers of less than 250 μm, are denoted as films or thin films. Throughout this text we will adhere to these definitions of 'sheets' and 'thin films'. Preferably a sheet according to the invention is thinner than 750 μm, more preferably thinner than 500 μm and most preferably thinner than 350 μm. A thin film according to the invention is preferably thinner than 200 μm, even more preferably thinner than 150 μm, still more preferably thinner than 100 μm, still more preferably thinner than 75 μm, still even more preferably thinner than 50 μm and most preferably thinner than 25 μm. The use of the carbon network in a film may suitably increase the conductivity and/or decrease the resistivity of a film. Said resistivity may be the surface and/or the volume resistivity. Such resistivity or conductivity may be measured by means of a Keithley picoammeter.

The skilled person will understand that a porous network refers to a 3-dimensional structure that allows fluids or gasses to pass through. A porous network may also be denoted as a porous medium or a porous material. The pore volume of the porous carbon networks according to the invention is 0.1-1.5 $cm^3/g$, preferably 0.2-1.5 $cm^3/g$, more preferably 0.3-1.3 $cm^3/g$ and most preferably 0.4-1.3 $cm^3/g$ as measured using the Brunauer, Emmett, and Teller (BET) method (ASTM D6556-09).

The carbon-nanofibre-comprising carbon networks may have an intraparticle pore diameter size as measured using Mercury Intrusion Porosimetry (ASTM D4404-10) of 5-150 nm, preferably 10-120 nm, and most preferably of 10-100 nm.

The carbon-nanofibre-comprising carbon networks may have an intraparticle volume as measured using Mercury Intrusion Porosimetry (ASTM D4404-10) of 0.10-1.1 $cm^3/g$, preferably 0.51-1.0 $cm^3/g$, and most preferably of 0.59-0.91 $cm^3/g$.

A porous carbon network according to the invention (or a porous carbon network particle of the invention) can be seen as a big molecule, wherein the carbon atoms inherently are covalently interconnected. It is hereby understood that a porous carbon network particle is a particle with chemically interconnected (i.e. covalently bonded) fibers having intraparticle porosity, as opposed to interparticle porosity which refers to a porous network created by multiple molecules or particles and wherein the pores are formed by the space between physically aggregated particles or molecules. In the context of the current invention, intraparticle porosity may also be denoted as intramolecular porosity as the carbon network particle according to the invention can be seen as a big molecule, wherein the pores are embedded. Hence intraparticle porosity and intramolecular porosity have the same meaning in the current text and may be used interchangeable to describe the porous networks of the invention. Compare with traditional carbon black which have no intraparticle porous structure within the carbon black particle, but aggregates of carbon black particles may have interparticle porosity properties. While interparticle/intermolecular is space between physical aggregated particles (networks), intraparticle/intramolecular is space within the network itself.

Without being bound to a theory, it is believed that the benefit of having a network with intraparticle porosity over a network with interparticle porosity is that the first are more robust and more resilient against crushing and breaking when force is applied. Intraparticle porosity refers to pores existing inside a (nano)particle. Interparticle porosity refers to pores existing as an effect of stacking individual particles The interparticle pores are weaker due to the particle-particle interface and tend to collapse. Intraparticle pores are strong due to the covalently bonded structure surrounding them and can withstand high forces and pressures without collapsing.

As addressed here above, known reinforcing agents, such as carbon black, consist of aggregates or agglomerates of spherical particles that may form a 3-dimensional structure, but without any covalent connection between the individual particles (not 'chemically interconnected'), thus having interparticle porosity. Summarizing, intraparticle porosity refers to the situation wherein the carbon atoms surrounding the pores are covalently connected, wherein interparticle porosity refers to pores residing between particles which are physically aggregated, agglomerated, or the like.

As the network of the invention can be seen as one big molecule, there is no need to fuse particles or parts of the network together. Hence it is preferred that the porous network of chemically interconnected, carbon-nanofibres are non-fused, intraparticle porous, chemically interconnected, carbon-nanofibre-comprising carbon networks, having intraparticle porosity. In a preferred embodiment, the intraparticle pore volume may be characterized as described further below, e.g. in terms of Mercury Intrusion Porosimetry (ASTM D4404-10) or Brunauer, Emmett and Teller (BET) method (ISO 9277:10).

The skilled person will readily understand that the term chemically interconnected in porous, chemically interconnected, carbon-nanofibre-comprising carbon networks implies that the carbon-nanofibres are interconnected to other carbon-nanofibres by chemical bonds. It is also understood that a chemical bond is a synonym for a molecular or a covalent bond. Typically those places where the carbon-nanofibres are connected are denoted as junctions or junctions of fibres, which may thus be conveniently addressed as 'covalent junctions' These terms are used interchangeable in this text. In the carbon networks according to the invention, the junctions are formed by covalently connected carbon atoms. It furthermore follows that the length of a fibre is defined as the distance between junctions which are connected by fibrous carbon material.

At least part of the fibres in the carbon-nanofibre-comprising networks of the invention are crystalline carbon-nanofibres. Preferably at least 20 wt. % of the carbon in the carbon networks in the invention is crystalline, more preferably at least 40 wt. %, even more preferably at least 60 wt. %, even more preferably at least 80 wt. % and most preferably at least 90 wt. %. Alternatively the amount of crystalline carbon is 20-90 wt. %, more preferably 30-70 wt. %, and more preferably 40-50 wt. % compared to the total carbon in the carbon networks of the invention. Here crystalline has its usual meaning and refers to a degree of structural order in a material. In other words the carbon atoms in the nanofibres are to some extent arranged in a regular, periodic manner. The areas or volumes which are crystalline can be denoted as crystallites. A carbon crystallite is hence an individual carbon crystal. A measure for the size of the carbon crystallites is the stacking height of graphitic layers. Standard ASTM grades of carbon black have a stacking height of the graphitic layers within these crystallites ranging from 11-13 Å (angstroms). The carbon-nanofibre-comprising carbon networks of the invention have a stacking height of at least 15 Å (angstroms), preferably at least 16 Å, more preferably at least 17 Å, even more preferably at least 18 Å, even more preferably at least 19 Å and still more preferably at least 20 Å. If needed the carbon networks with crystallites as large as 100 Å (angstroms) can be produced. Hence the carbon networks of the invention have a stacking height of up to 100 Å (angstroms), more preferably of up to 80 Å, even more preferably of up to 60 Å, even more preferably of up to 40 Å, still more preferably of up to 30 Å. It is therefore understood that the stacking height of graphitic layers within crystallites in the carbon networks of the invention is 15-90 Å (angstroms), more preferably 16-70 Å, even more preferably 17-50 Å, still more preferably 18-30 Å and most preferably 19-25 Å.

The porous, chemically interconnected, carbon-nanofibre-comprising carbon networks may be defined as having chemically interconnected carbon-nanofibres, wherein carbon-nanofibres are interconnected via junction parts, wherein several (typically 3 or more, preferably at least 10 or more) nanofibres are covalently joined. Said carbon-nanofibres are those parts of the network between junctions. The fibres typically are elongated bodies which are solid (i.e. non-hollow), preferably having an average diameter or thickness of 1-500 nm, preferably of 5-350 nm, more preferably up to 100 nm, in one embodiment 50-100 nm, compared to the average particle size of 10-400 nm for carbon black particles. In one embodiment, the average fibre length (i.e. the average distance between two junctions) is preferably in the range of 30-10,000 nm, more preferably 50-5,000 nm, more preferably 100-5,000 nm, more preferably at least 200-5,000 nm, as for instance can be determined using SEM.

The nanofibres or structures may preferably be described in terms of an average aspect ratio of fibre length-to-thickness of at least 2, preferably at least 3, more preferably at least 4, and most preferably at least 5, preferably at most below 50; in sharp contrast with the amorphous (physically associated) aggregates formed from spherical particles obtained through conventional carbon black manufacturing.

The carbon-nanofibre structures may be defined as carbon networks formed by chemically interconnected carbon-nanofibres. Said carbon networks have a 3-dimensional configuration wherein there is an opening between the carbon-nanofibres that is accessible to a continuous phase, which may be a liquid—such as a solvent or an aqueous phase—, a gas or any other phase. Said carbon networks are at least 0.5 μm in diameter, preferably at least 1 μm in diameter, preferably at least 5 μm in diameter, more preferably at least 10 μm in diameter, even more preferably at least 20 μm in diameter and most preferably 25 μm in all dimensions. Alternatively said carbon networks are at least 1 μm in diameter in 2 dimensions and at least 5 μm in diameter, preferably at least 10 μm in diameter, more preferably a least 20 μm in diameter and most preferably at least 25 μm in diameter in the other dimension. Here, and also throughout this text, the term dimension is used in its normal manner and refers to a spatial dimension. There are 3 spatial dimensions which are orthogonal to each other and which define space in its normal physical meaning. It is furthermore possible that said carbon networks are at least 10 μm in diameter in 2 dimensions and at least 15 μm in diameter, preferably at least 20 μm in diameter, more preferably a least 25 μm in diameter, more preferably at least 30 μm in diameter and most preferably at least 50 μm in diameter in the other dimension.

The carbon-nanofibre-comprising carbon networks may have a volume-based aggregate size as measured using laser diffraction (ISO 13320) or dynamic light scattering analysis of 0.1-100 μm, preferably 1-50 μm, more preferably 4-40 μm, more preferably of 5-35 μm, more preferably of 6-30 μm, more preferably of 7-25 μm and most preferably of 8-20 μm.

The surface area of the carbon-nanofibre-comprising carbon networks as measured according to the Brunauer, Emmett and Teller (BET) method (ISO 9277:10) is preferably in the range of 40-120 $m^2/g$, more preferably 45-110 $m^2/g$, even more preferably 50-100 $m^2/g$ and most preferably 50-90 $m^2/g$.

The porous, chemically interconnected, carbon-nanofibre-comprising carbon networks may also comprise carbon black particles built in as part of the network. These particles are profoundly found at the junctions between carbon-nanofibres, but there may also be carbon black particles present at other parts of the network. The carbon black particles preferably have a diameter of at least 0.5 times the diameter of the carbon-nanofibres, more preferably at least the same diameter of the carbon-nanofibres, even more preferably at least 2 times the diameter of the carbon-nanofibres, even more preferably at least 3 times the diameter of the carbon-nanofibres, still more preferably at least 4 times the diameter of the carbon-nanofibres and most preferably at least 5 times the diameter of the carbon-nanofibres. It is preferred that the diameter of the carbon black particles is at most 10 times the diameter of the carbon-nanofibres. Such mixed networks are denoted as hybrid networks.

The porous, chemically interconnected, carbon-nanofibre-comprising carbon networks have a functionalized surface. In other words, the surface comprises groups that alter the hydrophobic nature of the surface—which is typical for carbon—to a more hydrophilic nature. The surface of the carbon networks comprises carboxylic groups, hydroxylic groups and phenolics. These groups add some polarity to the surface and may change the properties of the compound material in which the functionalized carbon networks are embedded. Without wishing to be bound to a theory, it is believed that the functionalized groups bind to the elastomer, for instance by forming H-bonds, and therefore increase the resilience of the materials. Hence at least the stiffness and the durability of the material are altered which may result in lower rolling resistance and increased operational life span of the reinforced elastomer, in particular of tyres or conveyor belts comprising said reinforced elastomer.

The porous, chemically interconnected, carbon-nanofibre-comprising carbon networks may comprise metal catalyst nanoparticles. These are a fingerprint of the preparation method. These particles may have an average particle size between 1 nm and 100 nm. Preferably said particles are monodisperse particles having deviations from their average particle size which are within 10%, more preferably within 5%. Non-limiting examples of nanoparticles included in the carbon-nanofibre-comprising carbon networks are the noble metals (Pt, Pd, Au, Ag), iron-family elements (Fe, Co and Ni), Ru, and Cu. Suitable metal complexes may be (i) platinum precursors such as $H_2PtCl_6$; $H_2PtCl_6 \cdot xH_2O$; $K_2PtCl_4$; $K_2PtCl_4 \cdot xH_2O$; $Pt(NH_3)_4(NO_3)_2$; $Pt(C_5H_7O_2)_2$, (ii) ruthenium precursors such as $Ru(NO)(NO_3)_3$; $Ru(dip)_3 Cl_2$ [dip=4,7-diphenyl-1,10-fenanthroline]; $RuCl_3$, or (iii) palladium precursors such as $Pd(NO_3)_2$, or (iv) nickel precursors such as $NiCl_2$ or $NiCl_2 \cdot xH_2O$; $Ni(NO_3)_2$; $Ni(NO_3)_2 \cdot xH_2O$; $Ni(CH_3COO)_2$; $Ni(CH_3COO)_2 \cdot xH_2O$; $Ni(AOT)_2$ [AOT=bis(2-ethylhexyl)sulphosuccinate], wherein x may be any integer chosen from 1, 2, 3, 4, 5, 6, 7, 8, 9 or 10 and typically may be 6, 7 or 8.

The porous, chemically interconnected, carbon-nanofibre-comprising carbon networks are preferably obtainable by the process for the production of crystalline carbon networks in a reactor 3 which contains a reaction zone 3b and a termination zone 3c, by injecting a water-in-oil or bicontinuous micro-emulsion c comprising metal catalyst nanoparticles, into the reaction zone 3b which is at a temperature of above 600° C., preferably above 700° C., more preferably above 900° C., even more preferably above 1000° C., more preferably above 1100° C., preferably up to 3000° C., more preferably up to 2500° C., most preferably up to 2000° C., to produce crystalline carbon networks e, transferring these networks e to the termination zone 3c, and quenching or stopping the formation of crystalline carbon networks in the termination zone by spraying in water d.

In a more preferred embodiment, the networks are obtainable by the above process, said reactor being a furnace carbon black reactor 3 which contains, along the axis of the reactor 3, a combustion zone 3a, a reaction zone 3b and a termination zone 3c, by producing a stream of hot waste gas a1 in the combustion zone by burning a fuel a in an oxygen-containing gas b and passing the waste gas a1 from the combustion zone 3a into the reaction zone 3b, spraying a water-in-oil or bicontinuous micro-emulsion c comprising metal catalyst nanoparticles, in the reaction zone 3b containing the hot waste gas, carbonizing said emulsion at a temperature of above 600° C., preferably above 700° C., more preferably above 900° C., even more preferably above 1000° C., more preferably above 1100° C., preferably up to 3000° C., more preferably up to 2500° C., most preferably up to 2000° C., and quenching or stopping the reaction in the termination zone 3c by spraying in water d, to yield crystalline carbon networks e.

Figure 1A:
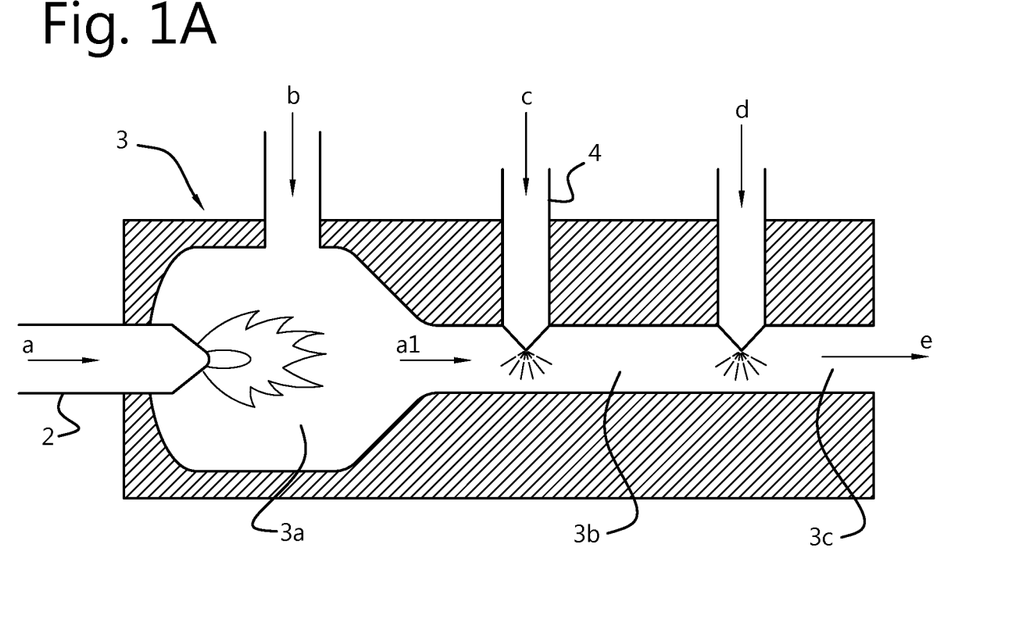
FIG. 1A is a schematic diagram of a continuous furnace carbon black producing process in accordance with the present invention which contains, along the axis of the reactor 3, a combustion zone 3a, a reaction zone 3b and a termination zone 3c, by producing a stream of hot waste gas a1 in the combustion zone by burning a fuel a in an oxygen-containing gas b and passing the waste gas a1 from the combustion zone 3a into the reaction zone 3b, spraying (atomizing) a single-phase emulsion c in the reaction zone 3b containing the hot waste gas, carbonizing said emulsion at increased temperature, and quenching or stopping the reaction in the termination zone 3c by spraying in water d, to obtain crystalline carbon networks e according to the invention.
Figure 1B:
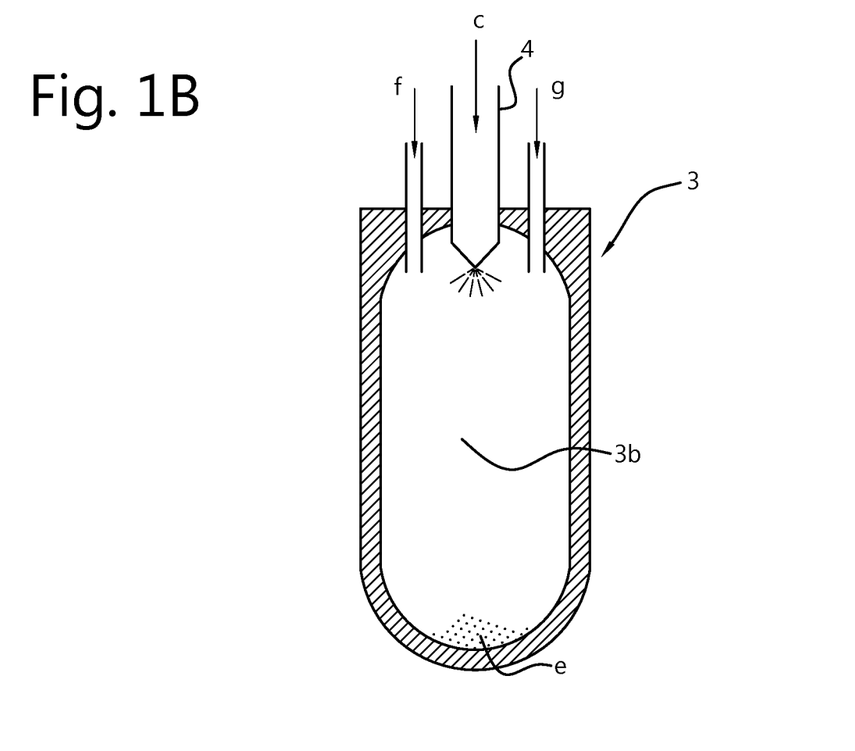
FIG. 1B is a schematic diagram of a semi-batch carbon black producing process where a single-phase emulsion c is atomized through a nozzle 4 at the top of the reactor 3 into the reactor zone 3b at elevated temperatures, carbonizing said emulsion at the elevated temperature in the reactor zone 3b, and collecting the crystalline carbon networks e at the bottom of the reactor. Additionally two gas-inlets are present that enter the reactor from the top, for adding inert gas f, preferably nitrogen for controlling and/or depletion of oxygen-levels, and for introducing a carbon-containing gas g into the reactor, preferably acetylene or ethylene.

The networks are preferably obtainable by the above process wherein further processing details are provided in the section headed "Process for obtaining carbon-nanofibre-comprising carbon networks" here below, and in FIG. 1A.

The invention may alternatively be described as the use of porous, chemically interconnected, carbon-nanofibres comprising carbon network for reducing the thickness of carbon-nanofibre-comprising layers. Alternatively the invention may be described as the use of porous, chemically interconnected, carbon-nanofibres comprising carbon network for reducing the thickness of carbon-nanofibre-comprising layers below 1000 μm, preferably below 750 μm, more preferably below 500 μm and most preferably below 350 μm. The invention may further be described as the use of porous, chemically interconnected, carbon-nanofibres comprising carbon network for reducing the thickness of carbon-nanofibre-comprising films below 250 μm, preferably below 150 μm, more preferably below 100 μm and most preferably below 50 μm.

The invention can hence be described as the use of porous, chemically interconnected, isotropic carbon-nanofibres comprising carbon network in an anti-static, electrostatic dissipative or conductive layer with a thickness of less than 1000 μm. Said layer is preferably a polymeric layer. Examples of suitable polymers for forming polymeric layers are polypropylene (PP), polyethylene (PE), polyamide (PA), polyvinyl chloride (PVC), polytetrafluor ethylene (PTFE), ethylene tetrafluoro ethylene (ETFE), polypropylene carbonate (PPC), cellulose triacetate (CTA), and polylactic acid (PLA).

However, any insulating polymer in which the carbon networks of the invention can be embedded and which can be processed into a layer, i.e. sheet or a film is suitable for the inventive use. Typically the polymers without the carbon networks are insulators, meaning that their volume resistivity is higher than $10^{10}$ Ω·cm, wherein the volume resistivity is defined in its usual manner which is according to ASTM D257. However the carbon networks may also be used to increase the conductivity of any material or layer. Preferably said material—i.e. the material without carbon networks, has a volume resistivity higher than $10^{10}$ Ω·cm, preferably higher than $10^{11}$ Ω·cm and more preferably higher than $10^{12}$ Ω·cm. Typically, the volume resistivity of the composite material, i.e. the material including carbon network, is in the range of $10^0$-$10^{12}$ Ω·cm, preferably in the range of $10^2$-$10^{10}$ Ω·cm, more preferably $10^3$-$10^{10}$ Ω·cm and most preferably $10^4$-$10^{10}$ Ω·cm. In one embodiment, the volume resistivity of the composite material is in the range of $10^3$-$10^8$ Ω·cm, preferably in the range of $10^4$-$10^8$ Ω·cm and more preferably $10^4$-$10^6$ Ω·cm. In an alternative embodiment, the volume resistivity of the composite material is in the range of $10^8$-$10^{12}$ Ω·cm, preferably in the range of $10^8$-$10^{10}$ Ω·cm.

The inclusion level of the porous, chemically interconnected, crystalline, carbon-nanofibre-comprising carbon networks may suitable be more than 10 wt. %, more preferably at least 15 wt. %, even more preferably at least 20 wt. %, still more preferably at least 25 wt. % and most preferably at least 30 wt. %. Alternatively the inclusion level is 10-45 wt. %, more preferably 12-35 wt. %, even more preferably 14-28 wt. % and most preferably 16-24 wt. %. Here wt. % is defined in its usual meaning and refers to the percentage by mass or the mass fraction normalized to 100%. It is defined as the amount of the specific component (here carbon networks) divided by the sum of all component (here the layer) and multiplied by 100%.

Application

In one aspect, the invention pertains to a layer of less than 1000 μm comprising at least 10 wt. % of a porous, chemically interconnected, isotropic carbon-nanofibre-comprising carbon network (or worded differently, a porous carbon network which comprises chemically interconnected carbon-nanofibres). Alternatively the layer comprises at least 15 wt. %, even more preferably at least 20 wt. %, still more preferably at least 25 wt. % and most preferably at least 30 wt. % of the carbon network. Alternatively the inclusion level of the carbon network is 10-50 wt. %, more preferably 12-45 wt. %, even more preferably 15-40 wt. % and most preferably 20-35 wt. %, based on the weight of the layer.

The layer can be a film or a sheet according to the aforementioned definitions. The layer of the invention is hence thinner than 1000 µm. Preferably said layer is thinner than 750 µm, more preferably thinner than 500 µm, and even more preferably thinner than 350 µm. Said layer may be a film of less than 250 µm, preferably less than 150 µm. Preferably the film of the invention is thinner than 100 µm, more preferably thinner than 75 µm, even more preferably thinner than 50 µm, still more preferably thinner than 35 µm and most preferably thinner than 25 µm. The layer is preferably at least 0.1 µm, more preferably at least 1 µm, even more preferably at least 2 µm, most preferably at least 5 µm. Layer thickness is measured with a non-destructive thickness gauge from Elcometer®, using magnetic, magnetic induction and eddy current thickness.

At the levels on inclusion above, the layer (preferably film) of the invention may have a volume resistivity lower than $10^{10}$ Ω·cm, more preferably lower than $10^8$ Ω·cm, even more preferably lower than $10^6$ Ω·cm, still more preferably lower than 104 Ω·cm, and most preferably lower than $10^0$ Ω·cm. Alternatively, the volume resistivity is $10^0$-$10^3$, $10^4$-$10^7$ Ω·cm, or $10^8$-$10^{10}$ Ω·cm. In qualitative terms, the layer of the invention is preferably anti-static, electro-dissipative, semi-conductive or conductive layer.

The above-described layer (preferably film) according to the invention can very suitably be used in many areas of technology. Hence the invention also covers an article of manufacture comprising the layer of the invention. Said article may be packaging material such as electrostatic protective packaging. Alternatively said article may be a tote box, a casing, or a conductive polymeric cover to store, ship, protect, or support electrical devices and equipment.

Also covered by the invention is a layer that has been applied as a coating or as an ink. This may be suitable for the production of printed electronics or for repairing anti-static, static-dissipative or conductive materials.

Process for Obtaining Carbon-Nanofibre-Comprising Carbon Networks

A process for obtaining the porous, chemically interconnected, carbon-nanofibre-comprising carbon networks can be described best as a modified carbon black manufacturing process, wherein 'modified' is understood that a suitable oil, preferably an oil comprising at least 14 C atoms (>C14) such as carbon black feedstock oil (CBFS), is provided to the reaction zone of a carbon black reactor as part of a single-phase emulsion, being a thermodynamically stable micro-emulsion, comprising metal catalyst nanoparticles. The emulsion is preferably provided to the reaction zone by spraying, thus atomizing the emulsion to droplets. While the process can be carried out batch or semi-batch wise, the modified carbon black manufacturing process is advantageously carried out as a continuous process. The single-phase emulsion is a micro-emulsion comprising metal catalyst nanoparticles. The preferred single-phase emulsion comprises CBFS oil, and may be referred to as 'emulsified CBFS' in the context of the invention. The process for the production of the carbon networks can be performed in a reactor 3 which contains a reaction zone 3b and a termination zone 3c, by injecting a single-phase emulsion c, being a micro-emulsion comprising metal catalyst nanoparticles, preferably a CBFS-comprising emulsion, into the reaction zone 3b which is at a temperature of above 600° C., preferably above 700° C., more preferably above 900° C., even more preferably above 1000° C., more preferably above 1100° C., preferably up to 3000° C., more preferably up to 2500° C., most preferably up to 2000° C., to produce porous, chemically interconnected, carbon-nanofibre-comprising carbon networks, transferring these networks to the termination zone 3c, and quenching or stopping the formation of porous, chemically interconnected, carbon-nanofibre-comprising carbon networks in the termination zone by spraying in water d. The single-phase emulsion is preferably sprayed into the reaction zone. Reference is made to FIG. 1A.

Alternatively the process for the production of the porous, chemically interconnected, carbon-nanofibre-comprising carbon networks is performed in a furnace carbon black reactor 3 which contains, along the axis of the reactor 3, a combustion zone 3a, a reaction zone 3b and a termination zone 3c, by producing a stream of hot waste gas a1 in the combustion zone by burning a fuel a in an oxygen-containing gas b and passing the waste gas a1 from the combustion zone 3a into the reaction zone 3b, spraying (atomizing) a single-phase emulsion c according to the invention, preferably a micro-emulsion comprising metal catalyst nanoparticles, preferably a CBFS-comprising emulsion, in the reaction zone 3b containing the hot waste gas, carbonizing said emulsion at increased temperatures (at a temperature of above 600° C., preferably above 700° C., more preferably above 900° C., even more preferably above 1000° C., more preferably above 1100° C., preferably up to 3000° C., more preferably up to 2500° C., most preferably up to 2000° C.), and quenching or stopping the reaction (i.e. the formation of porous, chemically interconnected, carbon-nanofibre-comprising carbon networks) in the termination zone 3c by spraying in water d. The reaction zone 3b comprises at least one inlet (preferably a nozzle) for introducing the emulsion, preferably by atomization. Reference is made to FIG. 1A.

Residence times for the emulsion in the reaction zone of the furnace carbon black reactor can be relatively short, preferably ranging from 1-1000 ms, more preferably 10-100 ms. Longer residence times may have an effect on the properties of the carbon networks. An example may be the size of crystallites which is higher when longer residence times are used.

In accordance with conventional carbon black manufacturing processes, the oil phase can be aromatic and/or aliphatic, preferably comprising at least 50 wt. % C14 or higher, more preferably at least 70 wt. % C14 or higher (based on the total weight of the oil). List of typical oils which can be used, but not limited to obtain stable emulsions are carbon black feedstock oils (CBFS), phenolic oil, anthracene oils, (short-medium-long chain) fatty acids, fatty acids esters and paraffins. The oil is preferably a C14 or higher. In one embodiment, the oil preferably has high aromaticity. Within the field, the aromaticity is preferably characterized in terms of the Bureau of Mines Correlation Index (BMCI). The oil preferably has a BMCI>50. In one embodiment, the oil is low in aromaticity, preferably having a BMCI<15.

CBFS is an economically attractive oil source in the context of the invention, and is preferably a heavy hydrocarbon mix comprising predominantly C14 to C50, the sum of C14-C50 preferably amounting to at least 50 wt. %, more preferably at least 70 wt. % of the feedstock. Some of the most important feedstocks used for producing carbon black include clarified slurry oil (CSO) obtained from fluid catalytic cracking of gas oils, ethylene cracker residue from naphtha steam cracking and coal tar oils. The presence of paraffins (<C15) substantially reduces their suitability, and a higher aromaticity is preferred. The concentration of aromatics determines the rate at which carbon nuclei are formed. The carbon black feedstock preferably has a high BMCI to be able to offer a high yield with minimum heat input hence reducing the cost of manufacturing. In a preferred embodiment, and in accordance with current CBFS specifications, the oil, including mixtures of oil, has a BMCI value of more than 120. While the skilled person has no difficulties understanding which are suitable CBFS, merely as a guide it is noted that—from a yield perspective—a BMCI value for CBFS is preferably more than 120, even more preferably more than 132. The amount of asphaltene in the oil is preferably lower than 10 wt. %, preferably lower than 5.0 wt. % of the CBFS weight. The CBFS preferably has low sulphur content, as sulphur adversely affects the product quality, leads to lower yield and corrodes the equipment.

It is preferred that the sulphur content of the oil according to ASTM D1619 is less than 8.0 wt. %, preferably below 4.0 wt. % more preferably less than 2.0 wt. %.

The emulsion, preferably a CBFS-comprising emulsion, is a "single-phase emulsion" which is understood to mean that the oil phase and the water phase optically appear as one miscible mixture showing no physical separation of oil, water or surfactant to the naked eye. The single-phase emulsion can be a macro-emulsion or a micro-emulsion, and can be either kinetically or thermodynamically stable. The process by which an emulsion completely breaks (coalescence), i.e. the system separates into bulk oil and water phases, is generally considered to be controlled by four different droplet loss mechanisms, i.e., Brownian flocculation, creaming, sedimentation flocculation and disproportionation.

A 'stable single-phase emulsion' within the context of the invention is understood to mean that the emulsion shows no physical separation visible to the eye, preferably reflected in terms of the emulsion not showing any change in pH by more than 1.0 pH unit and/or the emulsion not showing any change in viscosity by more than 20%, over a period of time that exceeds the carbon network production time. The term 'stable' can mean 'thermodynamically stable' or 'kinetically stable' (by adding energy, i.e. through mixing). In practice, the single-phase emulsion is regarded stable if no de-mixing optically arises, i.e. a single-phase is retained, for a period of at least 1 minute after preparation of the emulsion. It is thus preferred that the emulsion maintains its pH within 1.0 pH unit and/or its viscosity with less than 20% variation over a period of time of at least 1 minute, preferably at least 5 minutes after preparation. While for handling purposes an extended stability is preferred, it is noted that the manufacturing process can still benefit from using emulsions stable over relatively short time spans of 1 minute, preferably 5 minutes: By adding energy (mixing) the stability of the emulsion can be extended, and short-term stability can be extended using in-line mixing. While macro-emulsions are not thermodynamically stable, and will always revert to their original, immiscible separate oil and water phases, the break down rate can be sufficiently slow to render it kinetically stable for the length of the manufacturing process.

Provided that a stable, single-phase emulsion is obtained, the amounts of water and oil are not regarded limiting, but it is noted that reduced amounts of water (and increased amounts of oil) improve yields. The water content is typically between 5 and 50 wt % of the emulsion, preferably 10-40 wt %, even more preferably up to 30 wt %, more preferably 10-20 wt % of the emulsion. While higher amounts of water can be considered, it will be at the cost of yield. Without wishing to be bound by any theory, the inventors believe that the water phase attributes to the shape and morphology of the networks thus obtained.

The choice of surfactant(s) is not regarded a limiting factor, provided that the combination of the oil, water and surfactant(s) results in a stable micro-emulsion as defined here above. As further guidance to the skilled person, it is noted that the surfactant can be selected on the basis of the hydrophobicity or hydrophilicity of the system, i.e. the hydrophilic-lipophilic balance (HLB). The HLB of a surfactant is a measure of the degree to which it is hydrophilic or lipophilic, determined by calculating values for the different regions of the molecule, according to the Griffin or Davies method. The appropriate HLB value depends on the type of oil and the amount of oil and water in the emulsion, and can be readily determined by the skilled person on the basis of the requirements of retaining a thermodynamically stable, single phase emulsion as defined above. It is found that an emulsion comprising more than 50 wt % oil, preferably having less than 30 wt % water phase, would be stabilized best with a surfactant having an HLB value above 7, preferably above 8, more preferably above 9, most preferably above 10. On the other hand, an emulsion with at most 50 wt % oil would be stabilized best with a surfactant having an HLB value below 12, preferably below 11, more preferably below 10, most preferably below 9, particularly below 8. The surfactant is preferably selected to be compatible with the oil phase. In case the oil is a CBFS-comprising emulsion with a CBFS, a surfactant with high aromaticity is preferred, while an oil with low BMCI, such as characterized by BMCI<15, would be stabilized best using aliphatic surfactants. The surfactant(s) can be cationic, anionic or non-ionic, or a mixture thereof. One or more non-ionic surfactants are preferred, in order to increase the yields since no residual ions will be left in the final product. In order to obtain a clean tail gas stream, the surfactant structure is preferably low in sulfur and nitrogen, preferably free from sulfur and nitrogen. Non-limiting examples of typical non-ionic surfactants which can be used to obtain stables emulsions are commercially available series of Tween, Span, Hypermer, Pluronic, Emulan, Neodol, Triton X and Tergitol.

In the context of the invention, a micro-emulsion is a dispersion made of water, oil (preferably CBFS), and surfactant(s) that is a single optically and thermodynamically stable liquid with dispersed domain diameter varying approximately from 1 to 500 nm, preferably 1 to 100 nm, usually 10 to 50 nm. In a micro-emulsion the domains of the dispersed phase are either globular (i.e. droplets) or interconnected (to give a bicontinuous micro-emulsion). In a preferred embodiment, the surfactant tails form a continuous network in the oil-phase of a water-in-oil (w/o) emulsion or bicontinuous emulsion. The water domains should contain a metal catalyst, preferably having an average particle size between 1 nm and 100 nm.

The single-phase emulsion, i.e. a w/o or bicontinuous micro-emulsion, preferably a bicontinuous micro-emulsion, further comprises metal catalyst nanoparticles preferably having an average particle size between 1 and 100 nm. The skilled person will find ample guidance in the field of carbon nanotubes (CNTs) to produce and use these kinds of nanoparticles. These metal nanoparticles are found to improve network formation in terms of both rates and yields, and reproducibility. Methods for manufacturing suitable metal nanoparticles are found in Vinciguerra et al. "Growth mechanisms in chemical vapour deposited carbon nanotubes" Nanotechnology (2003) 14, 655; Perez-Cabero et al. "Growing mechanism of CNTs: a kinetic approach" J. Catal. (2004) 224, 197-205; Gavillet et al. "Microscopic mechanisms for the catalyst assisted growth of single-wall carbon nanotubes" Carbon. (2002) 40, 1649-1663 and Amelinckx et al. "A formation mechanism for catalytically grown helix-shaped graphite nanotubes" Science (1994) 265, 635-639, their contents about manufacturing metal nanoparticles herein incorporated by reference.

The metal catalyst nanoparticles are used in a bicontinuous or w/o microemulsion, preferably a CBFS-comprising bicontinuous or w/o micro-emulsion. In one embodiment, a bicontinuous micro-emulsion is most preferred. Advantageously, the uniformity of the metal particles is controlled in said (bicontinuous) micro-emulsion by mixing a first (bicontinuous) micro-emulsion in which the aqueous phase contains a metal complex salt capable of being reduced to the ultimate metal particles, and a second (bicontinuous) micro-emulsion in which the aqueous phase contains a reductor capable of reducing said metal complex salt; upon mixing the metal complex is reduced, thus forming metal particles. The controlled (bicontinuous) emulsion environment stabilizes the particles against sintering or Ostwald ripening. Size, concentrations and durability of the catalyst particles are readily controlled. It is considered routine experimentation to tune the average metal particle size within the above range, for instance by amending the molar ratio of metal precursor vs. the reducing agent. An increase in the relative amount of reducing agent yields smaller particles. The metal particles thus obtained are monodisperse, deviations from the average particle size are preferably within 10%, more preferably within 5%. Also, the present technology provides no restraint on the actual metal precursor, provided it can be reduced. Non-limiting examples of nanoparticles included in the carbon-nanofibre-comprising carbon networks are the noble metals (Pt, Pd, Au, Ag), iron-family elements (Fe, Co and Ni), Ru, and Cu. Suitable metal complexes may be (i) platinum precursors such as $H_2PtCl_6$; $H_2PtCl_6 \cdot xH_2O$; $K_2PtCl_4$; $K_2PtCl_4 \cdot xH_2O$; $Pt(NH_3)_4(NO_3)_2$; $Pt(C_5H_7O_2)_2$, (ii) ruthenium precursors such as $Ru(NO)(NO_3)_3$; $Ru(dip)_3Cl_2$ [dip=4,7-diphenyl-1,10-fenanthroline]; $RuCl_3$, or (iii) palladium precursors such as $Pd(NO_3)_2$, or (iv) nickel precursors such as $NiCl_2$ or $NiCl_2 \cdot xH_2O$; $Ni(NO_3)_2$; $Ni(NO_3)_2 \cdot xH_2O$; $Ni(CH_3COO)_2$; $Ni(CH_3COO)_2 \cdot xH_2O$; $Ni(AOT)_2$ [AOT=bis(2-ethylhexyl)sulphosuccinate], wherein x may be any integer chosen from 1, 2, 3, 4, 5, 6, 7, 8, 9 or 10 and typically is 6, 7 or 8. Non-limiting suitable reducing agents are hydrogen gas, sodium boron hydride, sodium bisulphate, hydrazine or hydrazine hydrate, ethylene glycol, methanol and ethanol. Also suited are citric acid and dodecylamine. The type of metal precursor is not an essential part of the invention. The metal of the particles of the (bicontinuous) micro-emulsion are preferably selected from the group consisting of Pt, Pd, Au, Ag, Fe, Co, Ni, Ru and Cu, and mixtures thereof, in order to control morphology of the carbon structures networks ultimately formed. The metal nanoparticles end up embedded inside these structures where the metal particles are physically attached to the structures. While there is no minimum concentration of metal particles at which these networks are formed—in fact networks are formed using the modified carbon black manufacturing process according to the invention—it was found that the yields increase with the metal particle concentrations. In a preferred embodiment, the active metal concentration is at least 1 mM, preferably at least 5 mM, preferably at least 10 mM, more preferably at least 15 mM, more preferably at least 20 mM, particularly at least 25 mM, most preferably up to 3500 mM, preferably up to 3000 mM. In one embodiment, the metal nanoparticles comprise up to 250 mM. These are concentrations of the catalyst relative to the amount of the aqueous phase of the (bicontinuous) micro-emulsion.

Atomization of the single-phase emulsion, preferably a CBFS-comprising emulsion, is preferably realized by spraying, using a nozzle-system 4, which allows the emulsion droplets to come in contact with the hot waste gas a1 in the reaction zone 3b, resulting in traditional carbonization, network formation and subsequent agglomeration, to produce carbon networks according to the invention. The injection step preferably involves increased temperatures above 600° C., preferably between 700 and 3000° C., more preferably between 900 and 2500° C., more preferably between 1100 and 2000° C.

In one aspect, the porous, chemically interconnected, carbon-nanofibre-comprising carbon networks preferably have at least one, preferably at least two, more preferably at least three, most preferably all of the following properties:
  (i) Iodine Adsorption Number (IAN) of at least 30 mg/g, preferably at least 50 mg/g, more preferably at least 100 mg/g, and most preferably at least 150 mg/g according to ASTM D1510. Alternatively the IAN is 30-1000 mg/g, preferably 100-800 mg/g and more preferably 30-500 mg/g according to ASTM D1510;
  (ii) Nitrogen Surface Area (N2SA) at least 30 $m^2/g$, preferably at least 50 $m^2/g$, more preferably at least 100 $m^2/g$, and most preferably at least 150 $m^2/g$ according to ASTM D6556. Alternatively N2SA is 30-1000 $m^2/g$, preferably 100-800 $m^2/g$ and more preferably 30-500 $m^2/g$ according to ASTM D6556;
  (iii) Statistical Thickness Surface Area (STSA) of at least 40 $m^2/g$, more preferably at least 70 $m^2/g$, even more preferably at least 100 $m^2/g$, even more preferably at least 125 $m^2/g$, and most preferably at least 150 $m^2/g$ according to ASTM D6556. Alternatively STSA is 40-1000 $m^2/g$, preferably 100-800 $m^2/g$ and more preferably 120-500 $m^2/g$, according to ASTM D6556;
  (iv) Oil Absorption Number (OAN) of at least 50 cc/100 g, preferably at least 75 cc/100 g, more preferably at least 100 cc/100 g, even more preferably at least 125 cc/100 g, and most preferably at least 150 cc/100 g according to ASTM D2414. Alternatively OAN is 50-500 cc/100 g, preferably 150-350 cc/100 g according to ASTM D2414,
wherein:
IAN=Iodine Adsorption Number: the number of grams of iodine adsorbed per kilogram of carbon black under specified conditions as defined in ASTM D1510;
N2SA=nitrogen surface area: the total surface area of carbon black that is calculated from nitrogen adsorption data using the B.E.T. theory, according to ASTM D6556;
STSA=statistical thickness surface area: the external surface area of carbon black that is calculated from nitrogen adsorption data using the de Boer theory and a carbon black model, according to ASTM D6556; and
OAN=Oil Absorption Number: the number of cubic centimeters of dibutyl phthalate (DBP) or paraffin oil absorbed by 100 g of carbon black under specified conditions. The OAN value is proportional to the degree of aggregation of structure level of the carbon black, determined according to ASTM D2414.

For each of IAN, N2SA (or NSA), STSA and OAN—all typical parameters for characterizing carbon black materials—the porous, chemically interconnected, carbon-nanofibre-comprising carbon networks exhibit superior properties compared to traditional carbon black. The porous, chemically interconnected, carbon-nanofibre-comprising carbon networks are preferably characterized by at least one, preferably at least two, more preferably all of (i), (ii) and (iii) since these are typical ways of characterized the surface area properties of the materials. In one embodiment, the porous, chemically interconnected, carbon-nanofibre-comprising carbon networks exhibit at least one of (i), (ii) and (iii), and further comply with (iv).

Process for Making a Film or Sheet

The films or sheets according to the invention can be made by any suitable process known by the skilled person. For example the film or sheet may be manufactured through cast film extrusion. In this process a polymer melt comprising the porous, chemically interconnected, carbon-nanofibres comprising carbon network is pushed through a flat die or a slot die to be formed into a film or sheet of the desired thickness. If required, for instance when coextruding, a feedblock can be used.

Alternatively the film may be produced using blow film extrusion. Here the polymer melt comprising the porous, chemically interconnected, carbon-nanofibres comprising carbon network is pushed through an annular slit die, usually vertically, to form a thin walled tube. Air is introduced via a hole in the centre of the die to blow up the tube (e.g. like a balloon). If needed a high-speed air ring may be used to blow cold air onto the hot film to cool it.

EXAMPLES

Example 1: Conductivity of Polymeric Material Comprising Carbon Nano-Fibre Comprising Carbon Networks Polypropylene copolymer (PPC, Moplen EP340M) layers of 50 μm thickness comprising 25, 30 or 35 wt. % of carbon nanofibre comprising carbon networks were produced using blow film extrusion using a blow installation BL 50 T with a die length of 30 mm (in case of 25 wt. % carbon networks) or cast film extrusion with a chill roll CR 72 T (in case of 30 or 35 wt. % carbon networks). The carbon networks were used as prepared similar to the manufacturing process of example 1 in WO2018/002137, its contents herein incorporated by reference. The networks had an average intraparticle pore diameter size as measured using Mercury Intrusion Porosimetry (ASTM D4404-10) of 20 nm. Melts were produced using a single screw extruder (Colllin; type Teach Line E20T; 42 L/D line; D=26 mm) set to 90 rpm for the blow film extrusion and 60 rpm for the cast film extrusion.

Table 1 gives the transversal and longitudinal surface resistivities of the films as a function of the inclusion level of the carbon networks. As can be seen, the surface resistivity in both the transversal and longitudinal direction gradually decreased as a function of increasing inclusion level of carbon networks. The surface resistivities were measured by means of a Keithley Picoammeter.

TABLE 1

Transversal and longitudinal surface resistivity versus carbon network inclusion level.

| | 25 wt. % | 30 wt. % | 35 wt. % |
|---|---|---|---|
| Transversal surface resistivity (Ω · cm) | $2.99 \cdot 10^5$ | $2.75 \cdot 10^5$ | $4.68 \cdot 10^4$ |
| Longitudinal surface resistivity (Ω · cm) | $1.94 \cdot 10^5$ | $1.61 \cdot 10^5$ | $2.53 \cdot 10^4$ |

Example 2: Viscosity of Polymeric Material Comprising Carbon Nano-Fibre Comprising Carbon Networks The carbon networks of the invention were used to produce anti-static, electrostatic dissipative or conducting films. For said films (close-to) percolation is required of the conductive filler, which normally comes with a high decrease in melt flow index (MFI)=increase in viscosity. It was found that the melt flow was not so much compromised with the carbon networks of the invention as with carbon black (CB). Decrease in melt flow index (MFI) means increase in viscosity, which limits the ability to process the mixture further. Especially for drawing thin films this is a critical parameter to obtain a uniform film (same thickness and properties).

Table 2 shows MFI data comparing PPC (PP copolymer) comprising the carbon networks of the invention vs CB VulcanXC72 (specialty CB, working horse for EC applications) according to ISO standard 1133-2005. The carbon networks were used as prepared similar to the manufacturing process of example 1 in WO2018/002137, its contents herein incorporated by reference. A decrease in MFI means an increase in viscosity. The carbon network of the inventicordfon in the PPC resulted in compounds with a lower viscosity compared to CB having the same loading. This means conductive thin films could be made with the carbon networks of the invention, whereas failure is likely with carbon black, particularly at low thickness.

TABLE 2

MFI data for PPC comprising CB or the carbon networks of the invention.

| | MFI (g/10 min) 230° C., 2.16 kg | |
|---|---|---|
| wt. % in melt | Carbon black | Carbon networks |
| 15 | 2.79 | 3.35 |
| 20 | <0.7 | 2.45 |
| 30* | 0.02 | 2.96 |

*Measured at 230° C., 5 kg

The invention claimed is:

1. An anti-static, electrostatic dissipative, semi-conductive or conductive layer with a thickness of less than 1000 μm, comprising at least 10 wt. % of a porous carbon network which comprises chemically interconnected carbon-nanofibres, wherein the carbon network is an intraparticle porous network wherein the carbon nanofibers are interconnected to other carbon nanofibers in the network by chemical bonds via junctions, wherein the pores in the network have an intraparticle pore diameter size of 5-150 nm using Mercury Intrusion Porosimetry according to ASTM D4404-10, wherein at least 20 wt % of the carbon in the carbon networks is in crystalline form, and the carbon nanofibers have an average aspect ratio of fibre length-to-thickness of at least 2, wherein the average fibre length of the carbon-nanofibres is 30-10,000 nm.

2. The layer of claim 1, wherein the layer is a polymeric layer.

3. The layer of claim 1, wherein the volume resistivity is 100-1010 Ω·cm.

4. The layer of claim 1, wherein the carbon network is obtainable by a process for producing crystalline carbon networks in a reactor 3 which contains a reaction zone 3b and a termination zone 3c, by injecting a water-in-oil or bicontinuous micro-emulsion c comprising metal catalyst nanoparticles, into the reaction zone 3b which is at a temperature of above 600° C., to produce crystalline carbon networks e, transferring these networks e to the termination zone 3c, and quenching or stopping the formation of crystalline carbon networks in the termination zone by spraying in water d.

5. An article of manufacture comprising the layer of claim 1.

6. The article of manufacture according to claim 5 wherein the layer is a deposited ink, an applied coating or a packaging material.

7. The layer of claim 1, with a thickness less than 250 µm.

8. The layer of claim 4, wherein the reaction zone 3b is at a temperature above 700° C.

9. The layer of claim 8, wherein the reaction zone 3b is at a temperature above 900° C.

10. The layer of claim 9, wherein the reaction zone 3b is at a temperature above 1000° C.

11. The layer of claim 10, wherein the reaction zone 3b is at a temperature above 1100° C.

12. The layer of claim 4, wherein the reaction zone 3b is at a temperature up to 3000° C.

13. The layer of claim 12, wherein the reaction zone 3b is at a temperature up to 2500° C.

14. The layer of claim 13, wherein the reaction zone 3b is at a temperature up to 2000° C.

\* \* \* \* \*